Aug. 8, 1950     F. P. PETERS     2,518,368

DRY CUP ASSEMBLY

Filed March 28, 1946

Inventor
Faith P. Peters
By Robert H. Wendt
Atty.

Patented Aug. 8, 1950

2,518,368

UNITED STATES PATENT OFFICE 2,518,368

DRY CUP ASSEMBLY

Faith P. Peters, Chicago, Ill., assignor to
Robert H. Wendt, Chicago, Ill.

Application March 28, 1946, Serial No. 657,823

10 Claims. (Cl. 65—13)

The present invention relates to dry cup assemblies, and is particularly concerned with the provision of an improved device for use with a cup and saucer or the like to maintain the bottom of the cup dry and to dispose constantly of all spillage of coffee or any other beverage, which may find its way into the saucer.

The difficulties of transporting a cup of coffee or some other beverage from the kitchen or coffee urn to the point of its consumption are very well known. Unless the cup is generously filled the patron may feel himself cheated, and if the cup is filled completely it is practically impossible to carry it to the table or counter without some spillage.

When the saucer has even a small amount of spillage in it, the lifting of the cup will inevitably carry some of the liquid with it which will gather in droplets on the bottom rim of the cup, dripping on the tablecloth, and in many cases on the clothing of the customer.

The natural impulse of the person serving the coffee or other beverage, if he or she has become conscious of the undesirability of spillage in the saucer, is to pour out the coffee spillage from the saucer to rectify the situation. However, at the place of consumption there is no convenient receptacle to receive the spillage other than the cup itself. The spillage is generally colder and when returned to the cup will lower the temperature of the coffee in the cup. Also, many customers have a natural repugnance at having the spilled or wasted coffee poured back into the cup.

Many ways have been suggested for avoiding the drippage of the coffee when the cup is lifted from the wet saucer. One of these ways is to fold a paper or cloth napkin, place it in the saucer to absorb the spilt coffee and then place the cup on top of the napkin. This practice is expensive when cloth napkins are employed, and ineffective when there is much coffee in the saucer or when paper napkins are employed.

One of the objects of the invention is the provision of an improved device for maintaining the bottom of a coffee cup or the like in a dry and well drained condition, and for disposing of the spillage of the coffee in a saucer so that it is no longer visible and so that it is confined and kept out of contact with the bottom of the coffee cup.

Another object of the invention is the provision of an improved cup and saucer assembly which includes means for positively sucking into a confined space or housing all spillage that may occur from the cup into the saucer and for maintaining such a positive drainage condition that there is no possibility of the cup dripping on the tablecloth or the clothing of the customer when the cup is lifted.

Another object of the invention is the provision of an improved cup and saucer assembly by means of which the cup may be provided with a liquid tight and air tight closure while it is being transported from the point where the coffee is poured to the point where it is to be consumed so that the coffee may be kept piping hot, and so that all spilling enroute may be avoided.

Another object of the invention is the provision of an improved step by step or intermittent suction device by means of which spilt coffee in a saucer may be periodically withdrawn under the device, and confined between the device and the saucer so that for all practical purposes the device is adapted to dispose of spillage automatically.

Another object of the invention is the provision of an antislip device for use in stacking cups of coffee and other beverages, by means of which a multiplicity of cups may be transported in a stack apart from the saucers so that each customer may be given a clean and dry saucer with his full cup of coffee.

Another object of the invention is the provision of an improved device of the class described, which is simple yet effective, capable of being economically manufactured, attractive in appearance, and adapted to be used for a long period of time without necessity for repair or replacement.

Other objects and advantages of the invention will be apparent from the following description and the accompanying drawings, in which similar characters of reference indicate similar parts throughout the several views.

Referring to the single sheet of drawings accompanying this specification,

Figure 1:
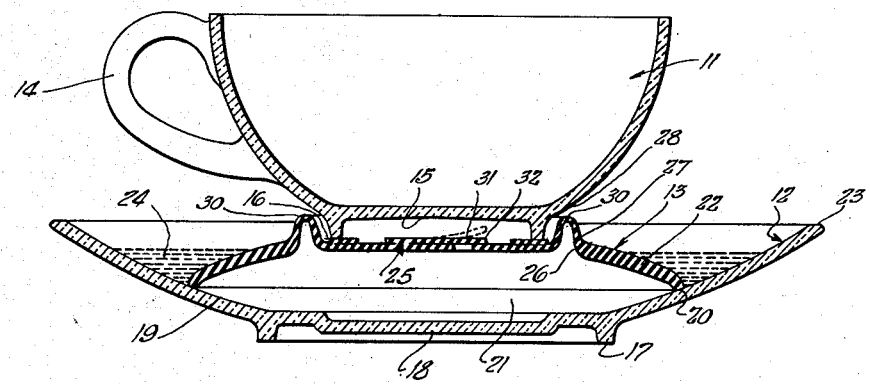
Fig. 1 is a front elevational view in partial section showing a cup and saucer assembly embodying the invention, the section through the saucer and antispillage device being taken on a plane passing through the axis of the saucer.

Referring to Fig. 1, 10 indicates in its entirety the cup and saucer assembly, which includes a conventional cup 11, a conventional saucer 12 and my improved antispillage device 13.

While the invention has its widest use in connection with beverages such as coffee it may be employed with all kinds of beverages and all kinds of receptacles that are used with saucers or other plates for receiving spillage.

The shape of the cup and the shape of the saucer may vary greatly, and those illustrated are merely conventional forms employed for demonstrating the uses of the invention. The beverage receptacle, such as the cup 11, may be provided with a handle 14 or may be without a handle as, for example, a soup bowl. If in the form of a tumbler, it may be provided with a simple flat bottom, but if a cup is employed it usually has a slightly concave circular bottom 15 provided with an annular drainage rib 16, which also serves as a stable base.

The saucer 12 may be the saucer for a cup or the saucer for a bowl such as a bowl of soup, and its external shape is of no particular importance. It is usually provided with an annular ridge 17 surrounding a circular flat bottom 18. The inner surface 19 of the saucer is generally concavely curved.

The antispillage device 13 is preferably constructed out of resilient flexible material having stretching characteristics, such as live resilient rubber. This may be natural vulcanized rubber or the modern synthetic rubber-like materials, such as that sold under the trade-name "Duprene." The color of the material may vary with the pattern and color of the dishes with which they are to be employed, the pastel shades being preferred as aiding materially to the attractive appearance of the assembly. Chalk white or ivory may also be employed with white dishes, and for the advantage of giving a sanitary appearance under all conditions.

The external finish of the device should be relatively smooth, yet resilient so that when the lower edge 20 of the device engages the inside of the saucer 12 a substantially tight joint is provided, which will retain liquid under the device 13 due to the external air pressure and to the fact that if the liquid were to leak out it would cause a suction or low pressure inside the chamber 21.

The device is preferably all made of one integral piece of material, but the various parts have different characteristics depending upon their size and shape. Thus the member 13 is a generally downwardly concave member which can be placed in the inverted position in a saucer forming chamber 21, the size of which is augmented by the concavity of the two members 12 and 13.

The member 13 includes an outer thick annular rim portion 22 which is concavely curved and which has the lower curved edge 20 for engaging the inside of the saucer. The size of the outer portion 22 is preferably such that the member 13 may be used as a cover for the cup 11, and so that its edge 20 engages the inside of the saucer at a point spaced from the outer edge 23 of the saucer, still leaving a drainage space 24 between the member 13 and the outer edge of the saucer.

The concavity of the outer portion 22 is preferably such that when the device is used it raises the position of the cup 11 slightly in the saucer 12 to provide an ample spillage space 24, but it does not elevate the cup much above the edge of the saucer.

In some embodiments of the invention, where the use of the member 13 as a cup cover is considered unimportant, the member 13 may be in the shape of an inverted cup with an outer cylindrical wall instead of the concave dished portion 22. The annular rim portion 22 is made thick enough to be relatively stiff as compared with the circular movable diaphragm or movable pumping portion 25, which is relatively thin, flexible and stretchable.

The annular rim portion 22 terminates and becomes thinner at a point indicated by 26 on the inside and 27 on the outside, which is preferably located outwardly of the cup base 15, 16 of the cup 11 so that the maximum to which the cup 11 may depress the diaphragm pumping 25 is the position in which the inner rim 26, 27 of the relatively stiff portion 22 engages the outside of the cup at 28.

Figure 2:
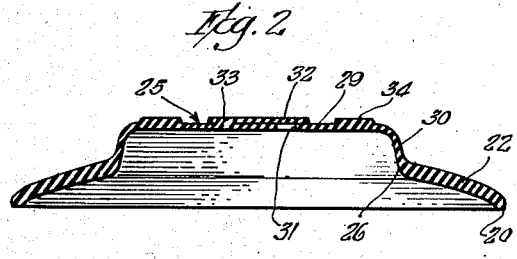
Fig. 2 is a similar view with the cup removed.
Figure 3:
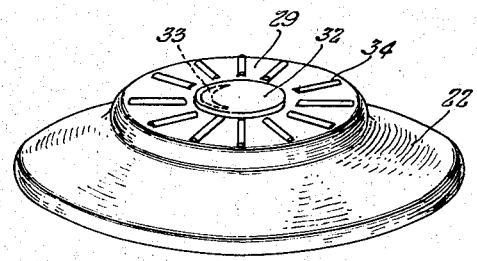
Fig. 3 is a view in perspective showing the top of the improved antispillage device.

The normal molded position of the diaphragm portion 25 is shown in Fig. 2 with the cup removed, and the diaphragm portion inherently springs back to the position of Fig. 2 when pressure is removed from the diaphragm. The diaphragm portion includes a circular flat portion 29 and a stretchable and tapered rim 30 which joins the flat portion 29 to the stiff annular supporting body 22.

The flat diaphragm portion 29 may be provided with an air opening 31 which is closed by a thin flexible flap valve 32 of the same material which is integrally vulcanized to the diaphragm 25 at 33 along an arcuate line spaced from the hole 31, but extending sufficiently so that it tends to hold the flap 32 in a position closing the hole 31.

The valve 32 is adapted to permit air to pass out of the hole 32 from the chamber 21, but prevents any air from passing in the opposite direction into chamber 21. If any of the beverage should wet the top of diaphragm 25, this will only make the flap valve 32 more effective in preventing leakage of air into the chamber 21.

Some embodiments of the invention may eliminate the flap valve 32 because it is not necessary until the level of the liquid in the closed chamber 21, below the member 13, has reached the level of the edge 20. As long as the edge 20 is accessible to air on the lower side of the member 13, the depression of the diaphragm 25 will result in air being driven out between the edge 20 and the saucer, and liquid 24 will be sucked in whenever the diaphragm 25 rises.

The flap valve 31 becomes necessary when the level of the liquid in the closed chamber 21 reaches the edge 20 because at that level air can no longer be forced out under the edge 20 to bubble up through the liquid 24. Thus, for a limited amount of liquid the present device will operate without a flap valve.

As previously stated, the normal unloaded shape of the diaphragm 25 is shown in Fig. 2 to which the diaphragm immediately springs when a cup is removed. In this position the top of the device 13 has perfect drainage, and all spilled beverage which may strike it drains into the space 24 in the saucer for spillage above the member 13. When a cup is placed on top of the diaphragm 25 the stretchable and flexible annular tapered rim portion 30 of the diaphragm bends down in a shape which may be partially U-shape in cross section, as shown in Fig. 1.

Any amount of downward movement of the diaphragm 25 diminishes the size of the chamber 21, driving air out of the aperture 31 past the flap valve 32. In addition to being used for sucking the coffee spillage into the space below the diaphragm, the present device may also be used for keeping the coffee hot and for transporting the filled cups of coffee in stacks without spillage.

Figure 4:
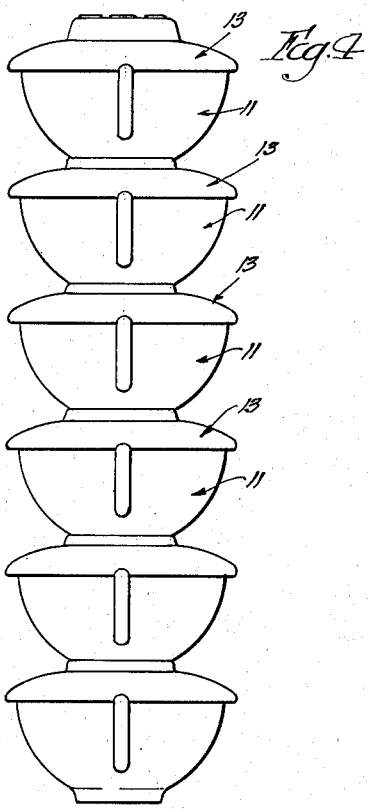
Fig. 4 is an elevational view of a stack of cups for maintaining the coffee hot, and for positively preventing leakage or spillage during transportation.

To keep the coffee hot it is only necessary to place the member 13 on top the cup, as shown in Figure 4. The resilient rubber makes a fairly tight contact with the upper rim of the cup, keeping the vapors and steam in the cup and preventing the loss of heat from the top of the free surface while the cup is covered.

A plurality of full cups can be arranged in a stack, as shown in Figure 4, and it will be noted that members 13 are then used to cover each cup and to support another cup immediately above each member 13. When so stacked the weight causes the diaphragm 25 to move downward to the position of Figure 1, providing a recess into which the lower part of the cup fits without tendency to slide to one side or the other, thus making the stack easier to carry.

The rubber engaging the top rim of each cup forms a liquid tight and air tight closure and prevents side slipping of the cups in the stack so that they may be carried with comparative safety and without losing any coffee. The coffee is maintained piping hot, its heat and its vapors being confined in the cup, and the saucers may be carried in a dry and clean condition in the other hand or on the tray with the plurality of stacks of cups.

Each guest may be served a full cup of coffee piping hot in a dry saucer and assuming the coffee will not be spilled by the guest, the user may dispense with its further use on some occasions. However, experience has shown that there is spillage of coffee even after the guest begins with a dry saucer, and whether the saucer is dry or wet the present device may be used to maintain the cup dry and to dispose of all drainage appearing in the saucer above the member 13 as follows:

Assuming that the saucer is dry and the cup is well filled, and the customer pours in a generous portion or as much cream as desired which fills the cup almost to the brim, in stirring there may be some spillage or in placing the wet spoon there may be spillage. If the member 13 is arranged as shown in Fig. 2 and the cup is placed upon it, the weight of the cup and coffee will depress the diaphragm 25. This will diminish the volume of the space 21 between the member 13 and saucer 12. In addition this will compress the air within space 21 and cause flow out through the hole 31, the pressure causing the flow and lifting the flap valve 32 which will resume its closed position as soon as the pressure inside and outside have been equalized.

Let us assume that the parts are then in the position of Fig. 1 and there is a small amount of coffee spillage in the annular space 24. When the cup 11 is lifted the diaphragm 25 will move from the position of Fig. 1 to that of Fig. 2. This will cause a decrease of air pressure in the chamber 21 which cannot be equalized by air passing through the hole 31 because this differential of pressure which is greater on the outside presses the flap valve 32 more tightly against the hole 31 to maintain its closure.

While the contact between the edge 20 of device 13 and saucer 12 is rubber to glass or porcelain which will prevent liquid from running out under slight pressures, under a continued pressure, the liquid spillage at 24 will leak under the edge 20 and will be sucked into the chamber 21. There it will be retained for the same reason that a glass full of water with a lower flat closure can be held in inverted position without emptying, as the external air pressure keeps it from leaking out.

Periodic or intermittent lifting and replacing of the cup 11 will cause the member 13 to suck all of the drainage into the chamber 21, even raising the level inside the chamber 21 above the edge of contact 20.

Thus the cup 11 is continuously disposed upon a surface that has natural drainage and the drainage is continuously sucked into the confined space 21 between the member 13. The cup is thus maintained in a dry and non-dripping condition.

Noise is reduced as the cup engages a rubber or resilient surface instead of hard porcelain. The dishes may be carried away with the cup empty or partly empty and the spillage still confined under the member 13 by stacking assemblies like that of Fig. 1.

It will thus be observed that I have invented an improved device for continuously confining the spillage and for maintaining the bottom of the beverage cup in a dry, non-dripping condition. My device may also be used for closing fresh cups of coffee to permit the cup to be generously filled and to be closed to prevent spillage or splashing while it is being carried.

The cups may be carried in stacks with such closure devices aiding in preventing side slippage and the coffee is maintained in a piping hot condition by confining its heat and vapors while it is being transported or until the guest desires to drink it.

The present devices are sanitary and may be sterilized and cleaned readily as there are no recesses which are apt to catch dirt, and they may be made to harmonize with the artistic appearance of the dishware.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention what I claim as new and desire to secure by United States Letters Patent, is:

1. An antidrip device for coffee cups, comprising an inwardly concave and outwardly convex member of resilient non-metallic material having an annular narrow curved downwardly extending edge to provide a line contact with a saucer when placed thereon with its concavity downward to form a chamber between the member and the saucer, the said member having a movable wall and being provided with a resilient flap valve on its upper side normally closing an opening and permitting expulsion of air from said chamber, whereby the member is adapted to suck in past its edge which engages the saucer, any leakage above the member in the saucer.

2. An antidrip device for coffee cups, comprising an inwardly concave and outwardly convex member of resilient non-metallic material having an annular narrow curved downwardly extending edge to provide a line contact with a saucer when placed thereon with its concavity downward to form a chamber between the member and the saucer, the said member having a movable wall and being provided with a resilient flap valve on its upper side normally closing an opening and permitting expulsion of air from said chamber, whereby the member is adapted to suck in past its edge which engages the saucer, any leakage above the member in the saucer, the said movable wall being centrally located and adapted to be engaged by the base of the coffee cup.

3. An antidrip device for coffee cups, comprising an inwardly concave and outwardly convex member of resilient non-metallic material having an annular narrow curved downwardly extending edge to provide a line contact with a saucer when placed thereon with its concavity downward to form a chamber between the member and the saucer, the said member having a movable wall and being provided with a resilient flap valve on its upper side normally closing an opening and permitting expulsion of air from said chamber, whereby the member is adapted to suck in past its edge which engages the saucer, any leakage above the member in the saucer, the said movable wall being centrally located and adapted to be engaged by the base of the coffee cup, and said member having a relatively stiff supporting body portion for supporting the movable wall and for engaging the inside of a saucer.

4. An antidrip device for coffee cups, comprising an inwardly concave and outwardly convex member of resilient non-metallic material having an outer annular, relatively rigid portion having an annular narrow curved downwardly extending edge to provide a line contact with a saucer when placed thereon with its concavity downward to form a chamber between the member and the saucer, the said member having a movable wall and being provided with a resilient flap valve on its upper side normally closing an opening and permitting expulsion of air from said chamber, whereby the member is adapted to suck in past its edge which engages the saucer, any leakage above the member in the saucer, the said movable wall comprising a circular flat portion surrounded and joined to said member by an annular bendable portion.

5. An antidrip device for coffee cups, comprising an inwardly concave and outwardly convex member of resilient non-metallic material having an outer annular, relatively rigid portion having an annular narrow curved downwardly extending edge to provide a line contact with a saucer when placed thereon with its concavity downward to form a chamber between the member and the saucer, the said member having a movable wall and being provided with a resilient flap valve on its upper side normally closing an opening and permitting expulsion of air from said chamber, whereby the member is adapted to suck in past its edge which engages the saucer, any leakage above the member in the saucer, the said movable wall comprising a circular flat portion surrounded and joined to said member by an annular bendable portion, said bendable portion urging said flat portion of said movable wall upward to effect external drainage and to increase volume of chamber beneath said member when a load is removed from said movable wall.

6. An anti-drip device for coffee cups, also adapted to be used between filled coffee cups in a stack, comprising a dished member of resilient nonmetallic material having a central movable diaphragm portion of sufficient size to be engaged by and to support the bottom of a cup, when said member is inverted on a saucer, said diaphragm being surrounded by an annular supporting body to which the diaphragm is joined by a flexible tapered wall normally biased upward and normally upwardly convex to form a self-draining cup support, said tapered wall being adapted to fold backwardly upon itself as the diaphragm is pushed downwardly by a cup, and returning to upper position when the cup is removed, whereby the anti-drip device may be placed in a saucer to form a closed chamber between the anti-drip device and the saucer, the placing of a cup on the diaphragm causing the diaphragm to descend, and driving air out of said closed chamber, to bubble through any drippage in the saucer, above the anti-drip device, the diaphragm returning upward, when the cup is removed, to suck the drippage into said closed chamber.

7. A cup and saucer assembly comprising a saucer, a cup and a resilient flexible member interposed between the cup and the saucer and supporting the cup on the saucer, said member comprising an inverted concave, circular body having a narrow outer lower edge engaging the saucer with a line contact to form a closed chamber, said member also having a central circular diaphragm portion which is normally upwardly convex and self-draining, said diaphragm portion being movable downwardly by the weight of said cup to reduce the volume of said chamber, and said diaphragm portion moving upwardly due to its normal resiliency when the cup is removed, to increase the volume of said chamber and suck drippings into said chamber from the annular space in said saucer outside said member, between the narrow lower edge and the saucer.

8. A cup and saucer assembly comprising a saucer, a cup and a resilient flexible member interposed between the cup and the saucer and supporting the cup on the saucer, said member comprising an inverted concave, circular body having a narrow outer lower edge engaging the saucer with a line contact to form a closed chamber, said member also having a central circular diaphragm portion which is normally upwardly convex and self-draining, said diaphragm portion being movable downwardly by the weight of said cup to reduce the volume of said chamber, and said diaphragm portion moving upwardly due to its normal resiliency when the cup is removed, to increase the volume of said chamber and suck drippings into said chamber from the annular space in said saucer outside said member, between the narrow lower edge and the saucer, said diaphragm being joined to said body by a tapered annular flexible wall, the upper part of said wall moving downward into the lower part of said wall when the diaphragm moves downward to form a recess for receiving the bottom of the cup when the cup is seated on said body.

9. A cup and saucer assembly comprising a saucer, a cup and a resilient flexible member interposed between the cup and the saucer and supporting the cup on the saucer, said member comprising an inverted concave, circular body having a narrow outer lower edge engaging the saucer with a line contact to form a closed chamber, said member also having a central circular diaphragm portion which is normally upwardly convex and self-draining, said diaphragm portion being movable downwardly by the weight of said cup to reduce the volume of said chamber, and said diaphragm portion moving upwardly due to its normal resiliency when the cup is removed, to increase the volume of said chamber and suck drippings into said chamber from the annular space in said saucer outside said member, between the narrow lower edge and the saucer, said diaphragm having a centrally located resilient flap valve on its upper side, normally closing an opening, to permit expulsion of air from said chamber through said opening when the diaphragm moves downward, but to close said opening when the diaphragm moves upward.

10. A cup and saucer assembly comprising a saucer, a cup and a resilient flexible member interposed between the cup and the saucer and supporting the cup on the saucer, said member comprising an inverted concave, circular body having a narrow outer lower edge engaging the saucer with a line contact to form a closed chamber, said member also having a central circular diaphragm portion which is normally upwardly convex and self-draining, said diaphragm portion being movable downwardly by the weight of said cup to reduce the volume of said chamber, and said diaphragm portion moving upwardly due to its normal resiliency when the cup is removed, to increase the volume of said chamber and suck drippings into said chamber from the annular space in said saucer outside said member, between the narrow lower edge and the saucer, said diaphragm having a plurality of radially extending ribs on its upper surface to engage the lower supporting rim of said cup and facilitate drainage from the diaphragm past said rim and to maintain the central portion of the diaphragm in a plane condition.

FAITH P. PETERS.

REFERENCES CITED

The following references are of record in the file of this patent:

UNITED STATES PATENTS

| Number | Name | Date |
| --- | --- | --- |
| 700,653 | Jobson | May 20, 1902 |
| 712,095 | Reed | Oct. 28, 1902 |
| 773,879 | Major | Nov. 1, 1904 |
| 799,381 | Hope | Sept. 12, 1905 |
| 862,953 | Westlake | Aug. 13, 1907 |
| 1,081,434 | Cote | Dec. 16, 1913 |
| 1,187,899 | Gardam | June 20, 1916 |
| 1,745,935 | Kirmser | Feb. 4, 1930 |
| 1,862,533 | Fish, Jr. | June 14, 1932 |
| 1,937,939 | Behrens | Dec. 5, 1933 |
| 2,003,657 | Stubblefield | June 4, 1935 |
| 2,041,563 | Meinecke | May 19, 1936 |
| 2,217,514 | Henry | Oct. 8, 1940 |

FOREIGN PATENTS

| Number | Country | Date |
| --- | --- | --- |
| 12,488 | Great Britain | June 15, 1899 |
| 27,962/30 | Australia | Apr. 13, 1931 |